April 20, 1937.  C. K. GIERINGER  2,077,833

NULL INDICATOR

Filed Feb. 11, 1935

INVENTOR.
Carl K. Gieringer

Wood + Wood ATTORNEYS

Patented Apr. 20, 1937

2,077,833

UNITED STATES PATENT OFFICE 2,077,833

NULL INDICATOR

Carl K. Gieringer, Miamitown, Ohio

Application February 11, 1935, Serial No. 6,001

7 Claims. (Cl. 171—95)

This invention relates to the detection and measuration of small alternating current voltages of variable frequency. More particularly, this invention is directed to an electrical circuit accurately sensitive to the presence of and to the variations in minute alternating current voltages and to the utilization of electrical apparatuses capable, when circuited according to my invention, of applying the detected and measured variations in alternating current voltages to uses for controlling physical and electrical changes.

The alternations or reversals in polarity, that is to say, the characteristic commonly called frequency of the alternating current, introduces difficulties in electrical detection of alternating current which are absent in the case of direct current where the polarity of the current is constant. The usual direct current type indicating meter, due to its sensitivity and accuracy, may be satisfactorily used for the detection and measurement of very minute direct current voltages or variations in the intensity thereof. The D. C. meter indicating threshold is considerably below that of the A. C. type meter and in addition the equipment is simple, compact and rugged.

Alternating current meters are sufficiently accurate for use in the measurement of comparatively large voltages over a considerable range of frequencies. As the voltage intensity decreases, however, the sensitivity and accuracy of this type of equipment recedes so as to make the equipment unsatisfactory for the detection of minute voltages or for use as a "null" indicator. The terminology "null indicator" is intended to designate that type of equipment satisfactory for the detection of minute voltages or currents near the zero level, and, in the particular case, alternating current voltages or currents below the range of sensitivity of the usual alternating current meters or indicators.

Alternating current voltages of comparatively large magnitude may be detected and measured by the use of a direct current meter in conjunction with a rectifier. This method is predicated upon the transformation of the alternating current to direct current by the use of a rectifier, and a measurement of the rectifier output voltage by the use of a D. C. meter. This method, however, though superior to the conventional type A. C. meter is not sufficiently accurate, reliable, or sensitive for null indications.

It is an object of this invention therefore to produce a null indicator susceptible to use for the accurate detection and measurement of small A. C. voltages.

Another object of this invention is to produce a null indicator, which embodies the use of a direct current type meter as the indicating means, and which is of greater sensitivity than the conventional rectified alternating current meter.

A still further object of this invention is to produce a null indicator, the indications from which are independent of modifications in the characteristics of the electrical circuit apparatus.

Another object of this invention is the production of a null indicator embodying alternating current wave rectification apparatus incorporated into a balancing circuit, the balance of which is responsive to input voltage variation.

A still further object of this invention is the production of a null indicator principled upon the current intensity-input voltage static characteristics of an alternating current rectifier, but operable within the range of greatest sensitivity of the rectifier.

A fuller understanding and further objects of my invention will be understood by reference to the accompanying drawing, in which.

Figure 1:
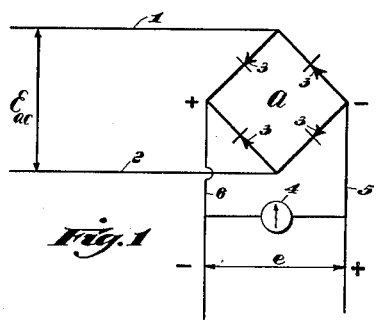
Figure 1 is an electrical diagrammatic view showing a simplified circuit of my invention.

If alternating current voltage $E_{ac}$ be applied to two dividing or opposed terminals of a bridge type rectifier, as indicated by the leads 1 and 2 applied to a rectifier bridge A of Figure 1, in which the rectifier elements are indicated by 3, and output current be measured by a D. C. type meter 4 shunted across a division of the rectifiers in the bridge, or more specifically, connected through leads 5 and 6 to the remaining terminals of the rectifier bridge, the indication of the meter 4 is proportional to the applied voltage $E_{ac}$.

Figure 2:
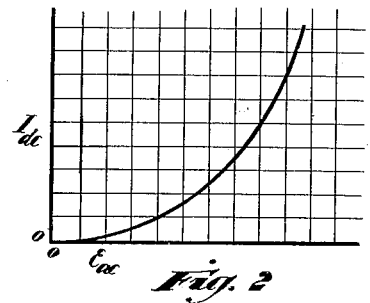
Figure 2 is a graphical view showing the rectification characteristics of an alternating current rectifier.

If corresponding values of the indicated current intensity $I_{dc}$ as measured by the indicator 4 be plotted in graphical form, as shown by Figure 2, for a number of different values of input voltage, a characteristic curve will be obtained. This curve is of conic nature and the slope of the curve is a function of the over-all admittance of the rectifier units 3 and the meter 4.

By inspection of the curve it will appear that at the lower ranges of applied voltage $E_{ac}$ the curve tends to parallel the abscissa and consequently large variations in the applied voltage $E_{ac}$ are necessary to effect minute changes of the output current. At high applied voltage ranges, conversely, the slope of the curve becomes steeper and therefore minute variations in applied voltage $E_{ac}$ of high value will result in accentuated rectifier output current indications.

The accuracy and sensitivity of a D. C. meter in conjunction with a rectifier is emphasized when used in the range of high applied voltage and diminished in the very range where accurate indications of output current are desired, that is to say, in the null indication range. To overcome this disadvantage I have found that if direct or pulsating voltage $e$ of polarity opposite to the polarity of the rectified current be applied to the direct current terminals of the rectifier A to buck the output current in the meter 4 of the rectifier, then the effect is accomplished of operating the rectifier at the high applied voltage range and minute applied voltage variations will be accurately indicated by the inherently accurate D. C. meter 4. In the circuit of Figure 1, since current is bucked out of the meter 4, the meter can be of the ultra sensitive D. C. type since the current flowing therethrough may be made zero, or thereabout as desired, by adjustment of the bucking voltage $e$. Thus, if the voltage $E_{ac}$ is a composite voltage comprising a fixed component and a variable component, and the bucking voltage $e$ be adjusted with respect to the fixed component of input voltage, the variable component deviations will be indicated by meter 4. The circuit disclosed is, therefore, highly advantageous where the variable component of voltage input is small, or relatively imperceptible when investigated by other methods.

A bridge type rectifier such as is disclosed in Figure 1 is capable of accomplishing full wave rectification. Each symbol $$\longrightarrow\!|\!\longrightarrow$$

corresponds to a single rectifier unit in which current can pass freely in the direction of the arrow, but cannot pass in the opposite direction. The usual copper oxide rectifiers, for instance, are suitable.

In the circuit disclosed in Figure 1, the bucking voltage $e$ should have constant average polarity. The applied voltage $E_{ac}$ is preferably adjusted to a value whereby the ratio of change of $E_{ac}$ to the corresponding change of current as indicated by the meter 4 is as great as possible. Under these conditions, the change in deflection of the meter 4 will be directly proportional to the difference between the effects of the applied voltage $E_{ac}$ and the bucking voltage $e$ on the indicator.

Reduction to reference values of the applied voltage change may be computed in the usual mathematical manner.

The bucking voltage $e$ may be supplied from any desirable source as by battery, constant polarity generator, or other medium. I have determined that another bridge type rectifier similar to that disclosed in Figure 1 may be used as the bucking voltage source.

Detection of minute alternating currents is frequently not only desirable but necessary in the utilization of potentiometer circuits, Wheatstone bridge circuits, differential circuits, and the like. One such type of circuit is shown in Figure 3.

This circuit, in general, comprises a Wheatstone bridge and a detector circuit connected to the bridge to indicate the condition of unbalance thereof. The detector circuit is, in general, connected to the Wheatstone bridge to replace the galvanometer ordinarily used in common Wheatstone bridge circuits. The detector circuit of the Wheatstone bridge disclosed in Figure 3, is principled upon the electrical characteristics of the circuit disclosed in Figure 1. However, in this detector circuit, a secondary rectifier is used to supply bucking voltage to the primary rectifier, a transformer is used to supply current to the secondary rectifier, and an auxiliary transformer is used to supply current to the primary rectifier whereby the same may be adjusted to its most sensitive operating range, e. g., the range of increased sensitivity as disclosed in Figure 2.

Figure 3:
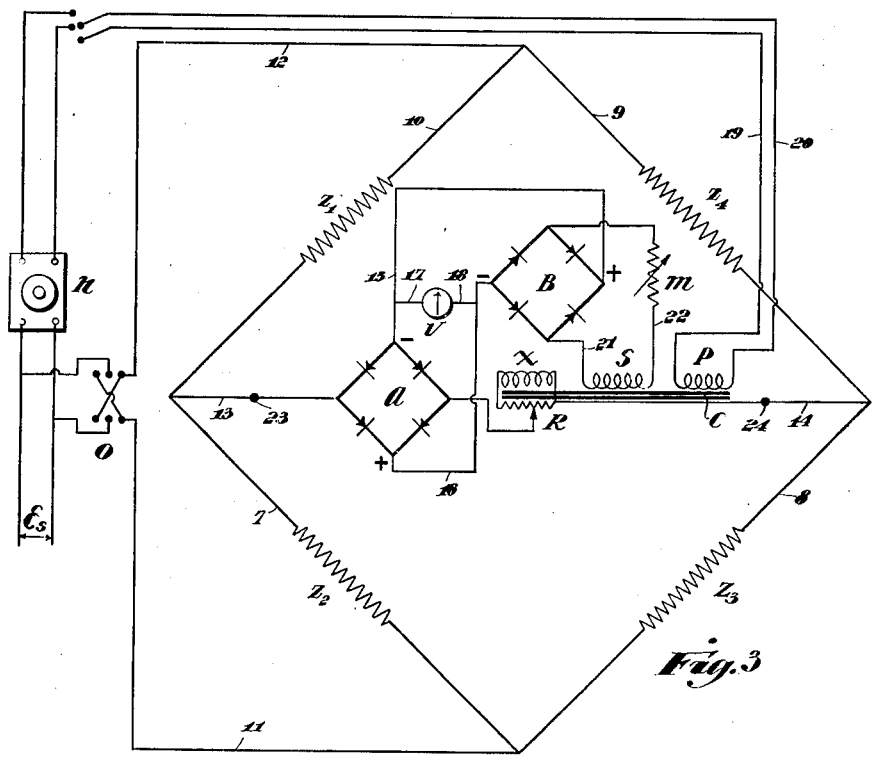
Figures 3 and 4 are electrical diagrammatic views of circuits principled upon the circuit shown in Figure 1.

Referring particularly to the circuit of Figure 3, impedances $Z_1$, $Z_2$, $Z_3$, and $Z_4$ are connected in bridge through the leads 7, 8, 9 and 10. Leads 11 and 12 supply current to the bridge at two opposed terminals. Leads 13 and 14 connect the bridge to the detector circuit from the remaining opposed terminals of the bridge. The detector circuit comprises a primary rectifier A, a secondary rectifier B, and a transformer including a primary winding P, a secondary winding S, and an auxiliary winding X, commonly wound over a core C. The rectifier B is connected to the rectifier A through the leads 15 and 16 so that the output currents from these units are of opposite polarity. A meter V is shunted across the terminals 15 and 16 by means of the leads 17 and 18. The primary winding of the transformer is supplied with energy from a suitable alternating current source through the leads 19 and 20. Voltage is supplied to the secondary rectifier B from the secondary winding S of the transformer through the leads 21 and 22, one of these leads including an adjustable resistance M whereby the additive current output from the rectifier B is adjusted to suit the primary rectifier requisites.

The auxiliary winding X of the transformer supplies current to a potientometer R which is in series with the lead 14 supplying current to the primary rectifier A. Following the law of superposition for electrical circuits, the auxiliary voltage supplied from the auxiliary transformer does not interfere with bridge operation but is used to increase the sensitivity of the circuit.

In the circuit disclosed in Figure 3, the voltage due to bridge unbalance, characterized as $\Delta e$, and the voltage supplied from the auxiliary transformer X through the potientometer, characterized as $E_p$, are analogous respectively to the variable and fixed components of $E_{ac}$ in Figure 1. Likewise the voltage supplied to primary rectifier A from secondary rectifier B, is analogous to the voltage $e$ of Figure 1.

Thus, when the sensitizing voltage applied to primary rectifier A from the transformer X through the potientometer R, and the rectifier voltage applied to primary rectifier A from secondary rectifier B are taken from suitable sources or a common alternating current source $E_a$, the indicator V will indicate voltage due to bridge unbalance ($\Delta e$).

The potientometer R is adjustable so that the range of greatest sensitivity may be procured under variable conditions of use. Resistance M is adjustable to suit altered conditions arising from the adjustment of potentiometer R.

The impedances $Z_1$, $Z_2$, $Z_3$, and $Z_4$ may be of the pure resistance type in which case no disturbance of the phase relationship between the output voltage from the bridge and the input voltage to the primary rectifier occurs. If the impedances $Z_1$, $Z_2$, $Z_3$, and $Z_4$ be of complex nature, that is to say, including resistance and capacitance, or resistance and inductance, then for each adjustment made in any one or more of the impedances the phase relationship between the voltages is disturbed. Vectorially speaking, when the voltage $E_p$, which is the major vector component, is directly in phase or directly out of phase with the voltage due to bridge unbalance ($\Delta e$), then the vectors are directly additive or subtractive and maximum deflection of the meter V will be obtained. When the voltage $E_p$ is not in phase with the voltage $\Delta e$, then the voltage $\Delta e$ will be vectorially additive or subtractive to the voltage $E_p$ and will consequently be of lesser magnitude and the sensitivity of the circuit will be diminished.

To operate the circuit in maximum sensitivity when the impedances $Z_1$, $Z_2$, $Z_3$, and $Z_4$ are of complex nature, a phase shifter $n$ is disposed in the circuit supplying current to the primary winding P. Adjustment of the phase shifter $n$, which may be of the usual type, will adjust the phase relationship between the voltages and the circuit may be made to exhibit maximum sensitivity. The phase shifter $n$ obviously need not be used where the impedances of the bridge are of the pure resistance type.

The circuit disclosed in Figure 3 is operable on currents having a wide range of frequency. Furthermore, the voltage applied to the Wheatstone bridge through the leads 11 and 12 need not be derived from the same source as the voltage applied to the transformer, but may be derived from a source having a frequency or magnitude different from that of the voltage $E_s$.

If the frequency of the voltage applied through the leads 11 and 12 is different from that of the voltage $E_s$ applied through the leads 19 and 20, and if the differential frequency be not too great, then a beat will be exhibited in the deflection of the meter V when the bridge is not balanced and the impedances $Z_1$, $Z_2$, $Z_3$, and $Z_4$ may be adjusted until the beat of the meter V no longer appears, in which case the bridge will be in exact balance. Obviously, if the periodicity of the beat is too great then the swing of the meter V will not be noticed.

The Wheatstone bridge may, however, derive current from the common source $E_s$, in which case the frequency of the voltages is the same, and a double pole reversing switch O is connected in the leads 11 and 12 whereby when the switch is flippd back and forth the meter V will deflect if the bridge is unbalanced.

The circuit disclosed in Figure 3 may be utilized to exactly determine the magnitude of any particular impedance if the remaining impedances are known, or the circuit may be utilized to determine the variations in a current replacing the current through any particular resistance or impedance provided the other three impedances are known. Furthermore, the detector portion only of the circuit disclosed in Figure 3 may be utilized to determine the variations in any particular applied voltage if the voltage subject to investigation be applied to the terminals 23 and 24, and the Wheatstone bridge impedances be removed.

In the adjustment of this circuit, if it is to be used as a Wheatstone bridge, the potentiometer R is adjusted to bring the operating current on the primary rectifier A into the range of maximum sensitivity. Then by adjustment of the impedances, the phase shifter, and reversals of the switch O, the circuit is brought to balance. When balance is obtained, if three of the impedances be known, the magnitude of the fourth impedance may be computed in the usual manner.

Since the currents from the primary and secondary rectifiers A and B are additive, any variation which occurs in the characteristics of these rectifiers is nullified, and consequently the circuit disclosed in Figure 3 is independent of variations in the electrical characteristics of the rectifier.

The principle upon which this circuit is predicated may be utilized not only to provide a piece of laboratory apparatus, but may be utilized in the construction of a pilot circuit control apparatus where variations in alternating current provide an originating impulse corresponding to or having relationship with some physical change. One method of using the apparatus to accomplish such an effect includes the annexation of a relay to the terminals of the indicator V. A relay thus connected may be used as an electrical impulse source to control any physical change or to adjust apparatus to counteract some physical change.

Figure 4:
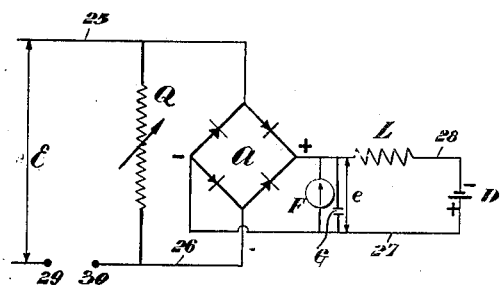

Figure 4 discloses a circuit which is adapted to regulate alternating current. In some types of electrical work it is particularly desirable to regulate a given current to a fixed value; for example, perhaps less than one-one hundredth of one percent. This circuit includes a primary rectifier A connected to a voltage source E, through the leads 25 and 26. A constant voltage battery D supplies current of polarity opposite to the rectifier through the leads 27 and 28, one of which includes a resistance L adapted to reduce the magnitude of the bucking voltage supplied to the rectifier A. A D. C. meter F and a condenser G are shunted across the leads 27 and 28. A resistance Q is shunted across the terminals 25 and 26.

Since the impedance of the rectifier is high, most of the current supplied through the source E will flow through the resistance Q. By adjusting the magnitude of the resistance Q so that the A. C. voltage applied across the rectifier will operate the rectifier at a point where its admittance approaches that of the D. C. meter F, the sensitivity of the meter and the rectifier will approach that of the meter alone.

The condenser G acts as a stabilizer in the circuit. By proper adjustment of the resistance L and the voltage supplied from the battery D the meter may be made to read zero or some reference value for any given value of the resistance Q, multiplied by the current flowing therethrough. Under these circumstances, any change in the current flowing through the resistance Q will be indicated by the meter which will respond directly to the difference between $e$ of Figure 4 and the rectified value of the product of Q times the current flowing therethrough. If, therefore, a constant alternating current voltage is required, it may be supplied from the circuit through the terminals 29 and 30. This method of accurately regulating alternating current is simple, compact and rugged, and is adaptable to a wide range of frequencies.

In each circuit disclosed, by mathematical computation the divisions on the scale of the meter may be made to read directly in terms of amperes flowing through the meter, whereby standard reference values may be obtained.

Having described my invention, I claim:

1. A null indicator adapted to be used for the detection and measuration of minute alternating currents, comprising, four bridge connected alternating current rectifiers, an indicating device shunted across two opposed terminals of the rectifier bridge, alternating current applied to the remaining two opposed terminals of the rectifier bridge, and means for applying a current of constant but opposite polarity to the indicator terminals to counteract the current in the indicator from the rectifier bridge.

2. A null indicator, comprising, a plurality of thin film metallic oxide rectifiers of the copper oxide rectifier type circuited in the form of a bridge, circuit connections to two terminals of the bridge for the application of the voltage under investigation, an indicator of the direct current type connected across the remaining terminals of the rectifier bridge, and corresponding in polarity thereto, and means for applying direct current of opposite polarity and of constant magnitude to the output terminals of the rectifier bridge, whereby the rectifier output current may be counteracted to a predetermined extent, for increasing the sensitivity of the circuit with respect to the applied voltage under investigation.

3. A null indicator adapted to detect minute alternating current voltages, comprising, a plurality of bridge circuited alternating current rectifiers, circuit connections for applying an alternating current to dividing terminals of the rectifier bridge, an indicator of the sensitive direct current type connected to the rectifier bridge output terminals, a second plurality of rectifiers similarly bridge circuited interconnected with the output terminals of said first rectifier but of polarity opposite to that of said first rectifier bridge, and means for applying a voltage to said second rectifier in synchrony with the applied voltage to said first rectifier, whereby said second rectifier imposes on said indicator a current counteractive in respect to the current flowing thereto from said first rectifier bridge.

4. A detector circuit for a Wheatstone bridge adapted to be applied to two terminals of said bridge to indicate the condition of unbalance thereof, which comprises, a primary bridge type rectifier, a secondary bridge type rectifier, and a transformer including a primary, a secondary and an auxiliary winding, said primary rectifier connected in said circuit to receive a fixed voltage component from said auxiliary transformer, to receive a variable component from a Wheatstone bridge in accordance with the condition of unbalance thereof and to receive a bucking current from said secondary rectifier counteractive in respect to the fixed component applied to the primary rectifier from said auxiliary transformer, said secondary rectifier deriving its alternating current from the same source as does the auxiliary transformer, the condition of unbalance of said Wheatstone bridge being indicated by means of a meter suitably located in said detector circuit to indicate the variable voltage component acting on said primary rectifier.

5. A new form of Wheatstone bridge, comprising, a plurality of impedances connected in a bridge, means for applying alternating current voltage to two opposite terminals of the Wheatstone bridge, said means including a reversing switch, and a detector circuit connected across the remaining opposite terminals of the Wheatstone bridge whereby the condition of unbalance of the bridge may be detected, said detector circuit comprising a primary rectifier circuit shunted across the indicator terminals of the Wheatstone bridge, said connection including in series means for applying voltage to the primary rectifier circuit whereby the same may be operated at the range of maximum sensitivity, a secondary rectifier circuit connected with said primary rectifier circuit and producing a current of polarity opposite to that produced by the primary rectifier circuit, means for applying alternating current for operation of said secondary rectifier circuit, and means for shifting the phase of said alternating current applied to the secondary rectifier circuit whereby the vectorial voltage differential acting on said primary rectifier circuit may be made of maximum value.

6. In a Wheatstone bridge, an indicator circuit applicable in a detector arm of said bridge, including a primary rectifier, the input terminals of which are connected to the bridge detector arm, means for applying a voltage having a polarity opposite to that of the output voltage of the rectifier to the output terminals of said rectifier, an indicator shunted across the output terminals of said rectifier, and a transformer, the output current from which is applied to the input terminals of said rectifier whereby the operating range of said rectifier may be increased to the threshold of greatest sensitivity.

7. An indicator adapted to detect and measure minute alternating currents, comprising, a group of alternating current rectifiers in bridge connection, an indicator shunted across a division of the group of rectifiers to measure the output current of said group, and means for applying to the indicator a constant current of which the polarity is opposite to that of the current applied to the indicator from the rectifier group.

CARL K. GIERINGER.